Nov. 3, 1936. C. C. FUERST 2,059,860
ROLL HOLDING CAMERA
Filed Feb. 8, 1935
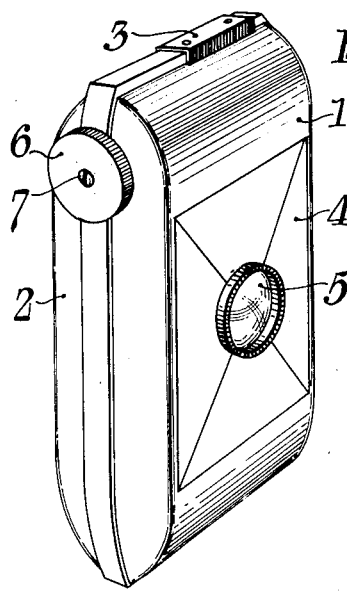
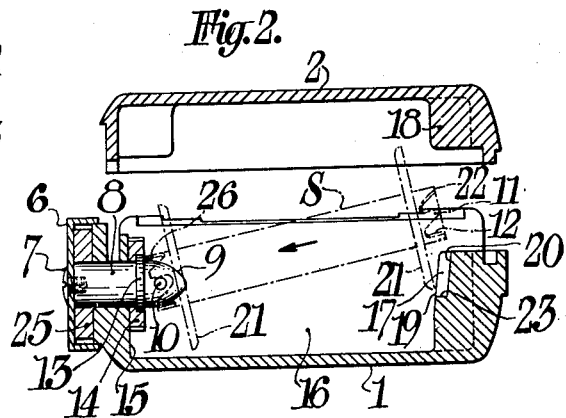
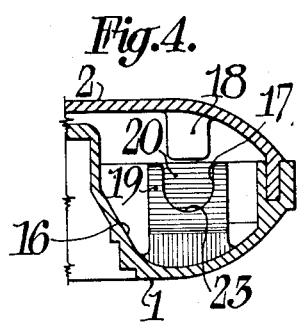
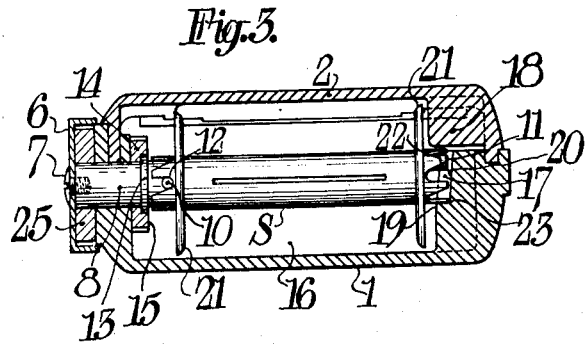
Inventor:
Carl C. Fuerst, Patented Nov. 3, 1936

2,059,860

UNITED STATES PATENT OFFICE 2,059,860

ROLL HOLDING CAMERA

Carl C. Fuerst, Rochester, N. Y., assignor, by mesne assignments, to Eastman Kodak Company, Jersey City, N. J., a corporation of New Jersey Application February 8, 1935, Serial No. 5,603

8 Claims. (Cl. 242—71)

This invention relates to photography, and more particularly to roll film cameras. One object of my invention is to provide a camera which can be quickly and easily loaded. Another object of my invention is to provide a camera spool chamber with a means for sliding a film spool into contact with a winding key during the movement of the spool down into the film spool chamber. Another object of my invention is to provide a winding key which is relatively fixed with respect to the camera and which permits a spool to turn about the end of the key as a spool is loaded into a spool chamber. Still another object of my invention is to provide a film spool support in which the winding key supports one end of the film spool and the opposite end of the spool is supported by a spool trunnion, their being means included in the spool trunnion for sliding the film spool axially as the film spool moves into the film spool chamber. Still another object of my invention is to provide a camera spool chamber with a cam adapted to strike a portion of the spool and to move it into contact with the winding key web and other objects will appear from the following specification, the novel features being particularly pointed out in the claims at the end thereof.

The recent trend of camera construction has been to make cameras smaller than usual and cameras which will also take film of smaller size than the previously known most popular sizes. As the size of the camera is decreased, it has become more and more difficult to provide a suitable film support which will permit an operator to quickly and properly position a film spool in the film spool chambers. It is to overcome these difficulties, particularly with small sized cameras that the following construction has been designed.

Coming now to the drawing wherein like reference characters denote like parts throughout.

Figure 1 is a perspective view of a typical small camera approximately full sized which may be equipped with an improved film winding mechanism constructed in accordance with and embodying a preferred form of my invention.

Figure 2 is an enlarged sectional view through the winding key shaft and spool chamber, the camera cover being partially removed from the camera.

Figure 3 is a view similar to Figure 2, but with the spool shown in full lines in winding position and with the camera cover in place.

Figure 4 is a fragmentary sectional view showing the spool trunnion opposite to the winding key.

In accordance with a preferred embodiment of my invention, the camera may consist as shown in Figure 1 of a camera body 1 having a removable back 2 which may be held in place by a slidable latch 3. The camera front 4 may be drawn out to position the objective 5 for taking pictures.

A winding key or knob 6 may be attached by means of a screw 7 to a post 8, this post terminating in a tapered or rounded end 9. A key web or pin 10 extends transversely through the post 8 and is adapted to engage the slot of spool S which is preferably of the type including a series of ratchet like teeth 11 so that there will be a plurality of slots 12 which may be engaged by the pin.

The post 8 may be held in place by a collar 13 which holds a ratchet wheel 14 against an endwall 15 of the spool chamber 16, if desired, although it is not necessary to provide the ratchet wheel 14 unless an automatic stop for the winding key is to be used.

The opposite end of the spool chamber 16 is provided with a seat 17, best shown in Figure 4, which, with a downwardly extending lug 18 on the camera back 2 provides a trunnion for the end of the spool opposite to the winding key.

In order to facilitate positioning the spool in proper engagement with the winding key, I prefer to provide cam surfaces 19 and 20 on the walls of the seat 17 so that if a spool S is engaged with the tapered end 9 on the key post 8, as indicated in Figure 2, and is then dropped into the spool chamber 16, the cam surfaces 19 and 20 will move the spool toward the winding key post in the direction shown by the arrow in Figure 2 as the spool slides down the cam. Cam surface 19 is designed to engage a flange 21 of the spool and cam surface 20 is designed to engage a part of the trunnion 22 of the spool. The device can be made to function with either one or the other of these cams omitted, but I prefer to utilize the structure shown.

Referring particularly to Figure 3, it should be noticed that the base or bottom 23 of the seat 17 is so positioned with respect to the winding web 10 of the key post 8 that when the spool S has slid down to the bottom of the seat and is properly positioned for winding film through the camera, that the winding web or post 10 will be located in the base of a slot 12 and will consequently be properly positioned for driving the film spool.

In this position the lug 18 on the camera back 2 will hold the spool trunnion definitely in the seat 17 so that there is no possibility of the spool being improperly positioned for winding.

As is customary with winding keys, I prefer to provide a oneway clutch in connection with the post 8. This permits the film spool to be turned in only one direction and, since the clutch forms no part of my present invention, it will not be further described.

The operation of loading a camera constructed in accordance with my invention is an extremely simple one, since it is only necessary to move a spool until the hollow end of the spool core 26 is brought into engagement with the tapered end 9 of the winding key post 8. It is not necessary to engage any of the spool slots 12 with the key web 10. By merely dropping the spool into the spool chamber 16, the spool flange 21 will cooperate with the cam 19 so that the spool will move toward the winding key. If not already properly positioned so that a slot 12 may engage the key web 10, the spool will turn as the tooth-like trunnion slots come into engagement with the pin as the spool is moved axially of the winding key in moving down into the spool chamber.

While I have shown as a preferred embodiment of my invention a spool supporting end winding structure built into a compact folding camera, it is obvious that the structure can be applied to a variety of sizes and shapes of roll film cameras and I contemplate, as within the scope of my invention, all such structures as may come within the terms of the appended claims.

Having now described my invention what I desire to secure by Letters Patent of the United States and what I claim is:

1. In a camera for use with film wound on spools, the combination with a camera body, of a spool chamber therein, a winding mechanism mounted to turn but not to slide on the camera body and adapted to engage and turn a spool located in one end of said spool chamber, and a cam mounted in the opposite end of the spool chamber adapted to move a spool toward said winding mechanism as said spool moves into the spool chamber.

2. In a camera for use with film wound on spools, the combination with a camera body, of a spool chamber therein, a winding mechanism mounted to turn but not to slide on the camera body and adapted to engage and turn a spool located in one end of said spool chamber, a spool supporting member in the opposite end of the spool chamber, including a cam adapted to move the spool towards the winding mechanism as a spool is placed in engagement with the spool supporting member.

3. In a camera for use with film wound on spools, the combination with a camera body, of a spool chamber therein, a winding mechanism mounted to turn but not to slide on the camera body and adapted to engage and turn a spool located in one end of said spool chamber, and a cam mounted in the opposite end of the spool chamber positioned and arranged to engage the end of a spool being placed in the spool chamber, whereby said spool as it approaches the spool chamber may be cammed axially toward said winding mechanism.

4. In a camera for use with film wound on spools, the combination with a camera body, of a spool chamber therein, a removable back for the camera body adapted to cover and uncover the spool chamber, a winding mechanism having a tapering end upon which a spool may swing extending into the spool chamber a fixed distance and being capable of turning but not of moving axially of the chamber, a web to engage a spool slot carried by the tapered end of the winding mechanism, a fixed cam in the opposite end of the spool chamber from the winding key adapted to engage a spool entered into the spool chamber when the back is removed for moving said spool into engagement with the web as the spool moves downwardly into the film spool chamber.

5. In a camera for use with film wound on spools, the combination with a camera body, of a spool chamber therein, a removable camera back for the camera adapted to form a part of the spool chamber when mounted on the camera and to expose the spool chamber when removed from the camera, a winding device mounted on the camera and extending into the spool chamber mounted to turn but not to move axially relatively to the spool chamber, said winding device including a tapered end and a web thereon for engaging a spool slot, means for supporting a spool located in the other end of the spool chamber, said means including a cam positioned in the path of a film spool being moved into the spool chamber when the camera back is open whereby the cam and flange may engage and move the spool axially toward said winding key web.

6. In a camera for use with film wound on spools, the combination with a camera body, of a spool chamber therein, a camera back movably mounted on the camera body and adapted to cover and uncover the spool chamber, a winding mechanism including a shaft having a tapering end on which a spool may swing, said shaft being rotatably and non-slidably mounted in one end of said spool chamber, a web carried by the tapered shaft for engaging a film spool slot, means located in the other end of said spool chamber for supporting a spool, said means including a fixed cam spaced a fixed distance from the end of the tapered shaft and positioned in the path of a film spool flange being lowered into the spool chamber when the camera back is uncovering the spool chamber whereby the cam and flange may engage and move the spool axially toward said winding key web, and a stop positioned near the cam adapted to hold a spool in engagement with the winding key web after the spool has been positioned by the flange.

7. In a camera for use with film wound on spools including flanges carried by a hollow ended core, the combination with a camera body, of a spool chamber therein, a camera back movably mounted on the camera body to cover and uncover said spool chamber, a winding key including a shaft having a rounded end extending a fixed distance into one end of the spool chamber, said shaft being revolvably but not slidably mounted on said camera body, the tapered end of said shaft being adapted to enter the hollow end of the core of a spool, and a cam fixedly mounted in the opposite end of the spool chamber from the winding key end adapted to move the spool onto the shaft as the spool moves into the spool chamber.

8. In a camera for use with film wound on spools, including flanges carried by a hollow ended core, the combination with a camera body, of a spool chamber therein, a winding key in one end thereof mounted to turn but not to slide relatively to the spool chamber and including a shaft having a smooth tapered end on which a spool may swing and a key web carried by the shaft, the tapered end of the shaft being adapted to support an end of a hollow spool core, a cam fixedly mounted in the opposite end of the spool chamber and spaced from the key web a distance approximately equal to the length of the hollow core whereby a spool may be positioned by engaging an end with the tapered winding key and dropping the opposite end against the cam causing the spool to move onto the shaft and into engagement with the key web.

CARL C. FUERST.